STORAGE-STATE-INDICATING DEVICE
Original Filed June 17, 1959
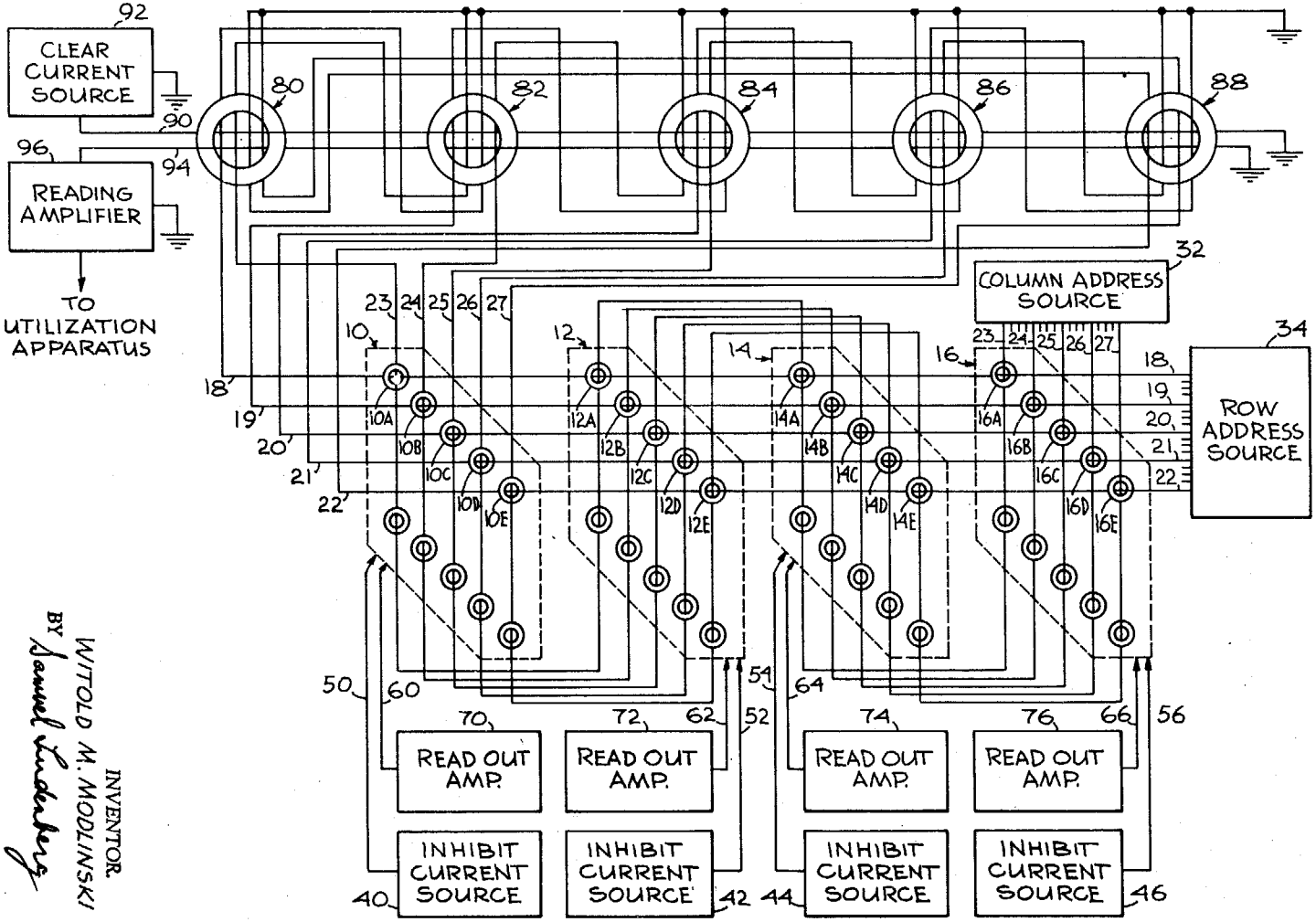
INVENTOR.
WITOLD M. MODLINSKI
BY Samuel Lindenberg
ATTORNEY United States Patent Office Re. 25,660
Reissued Oct. 13, 1964

25,660

STORAGE-STATE-INDICATING DEVICE

Witold M. Modlinski, Los Angeles, Calif., assignor, by mesne assignments, to Ampex Corporation, Redwood City, Calif., a corporation of California Original No. 3,110,887, dated Nov. 12, 1963, Ser. No. 821,012, June 17, 1959. Application for reissue Mar. 9, 1964, Ser. No. 367,909
6 Claims. (Cl. 340—174)

Matter enclosed in heavy brackets [ ] appears in the original patent but forms no part of this reissue specification; matter printed in italics indicates the additions made by reissue.

This invention relates to data-storage devices employing magnetic cores and, more particularly, to improvements therein.

Storage systems of the type which employ toroidal-shaped magnetic cores, each of which has two stable states of magnetic remanence for the purpose of storing a binary bit of information, have an established position in the information-handling field. Three different types of magnetic-core storage apparatus may be employed in any information-handling system. The first type is a random-access storage arrangement, which usually is fairly large. The second type is a buffer storage system, which usually is not random access, nor is it as large as a random-access system. The smallest form of a memory employing cores is usually called a shift register.

The present invention concerns itself with the form of memory usually called a buffer storage memory, which is not random access but which is loaded with data in a desired loading sequence and is unloaded in the same sequence as it is loaded. Such a storage system usually finds application where it is desired to transfer data which is received at one rate from apparatus to apparatus which can receive that data at another rate, which can be higher or lower than the apparatus providing the data. For example, if it is desired to transfer data from a magnetic drum to magnetic tape, usually the data is read from the drum into a buffer storage system, and then from the buffer storage system to the magnetic tape.

It is extremely useful to know the state of the storage in a buffer storage system. By that is meant when, for example, in the process of loading, the buffer storage system has received certain amounts of data, or when in the process of unloading the buffer storage system has unloaded certain predetermined amounts of data. These signals can be used for initiating the operation of other equipment or terminating the operation of other equipment which co-operate with the buffer store.

An object of the present invention is to provide a novel arrangement for indicating the state of storage in the magnetic-core memory.

Another object of the present invention is the provision of a unique arrangement for providing signals each time a magnetic-core storage arrangement attains a predetermined storage state.

Yet another object of the present invention is the provision of a novel and useful system for operating in conjunction with a buffer storage system for providing output signals which show the amount of data in the storage system.

These and other objects of the invention are achieved in an arrangement comprising the combination with a type of magnetic-core storage system, wherein data is entered successively in a sequence and is read out successively in the same sequence, of a ring counter. The counter includes a magnetic core which is associated with each storage state of the magnetic-core memory for which an output signal indicative of that state is desired. The magnetic cores are arranged in a sequence corresponding to that of the desired signal sequence. The counter is initially cleared by driving all but the first of the cores in the sequence to their clear condition. The first core is driven to its set condition. When the magnetic-core memory achieves the state of storage for which a signal indicative thereof is desired, means are provided for driving a magnetic core associated with that state to its clear condition and the succeeding magnetic core in the sequence to its set condition. A reading coil is coupled to all the cores in the counter in a manner whereby an output is obtained from both the cores which are driven.

The novel features that are considered characteristic of this invention are set forth with particularity in the appended claims. The invention itself, both as to its organization and method of operation, as well as additional objects and advantages thereof, will best be understood from the following description when read in connection with the accompanying single figure drawing, which shows in schematic form an embodiment of the invention.

Referring now to the drawing, there may be seen a schematic drawing of the embodiment of the invention. This shows the invention being employed with a memory arrangement of the type considered as a buffer storage system. Those skilled in the art will appreciate, however, that the concept of this invention is applicable to different sizes of storage systems which indeed may be large enough to be full-size memories. Further, the buffer storage system about to be described is not the only type with which the embodiment of the invention may be employed. Thus the description herein is not to be construed as a limitation upon the invention, but merely exemplary of its applicability.

As is well-known, one preferred arrangement of a magnetic-core storage system is the type which utilizes a plurality of magnetic-core plane arrays 10, 12, 14, 16. Each one of these will include a plurality of magnetic cores, here exemplified by 10A, 12A, 14A, and 16A. These magnetic cores are preferably toroidal in shape and have what are commonly called substantially rectangular hysteresis characteristics. Thus, they will have two stable states of magnetic remanence and are drivable from one to the other state by the application thereto of a coercive force which exceeds a critical value. In each core plane, the cores are arranged in columns and rows. A row coil, here designated by reference numerals 18, 19, 20, 21, and 22, will be inductively coupled to a core in a row which is correspondingly positioned in every one of the core planes. A column coil, here identified by reference numerals 23, 24, 25, 26, 27, is inductively coupled to all the cores in a column which is identically located in each one of the core planes. Thus, when current is applied to the row coil 18, a coercive force is applied to the core 10A, 12A, 14A, 16A in each one of the core planes to which the row coil 18 is coupled. Simiy, should current be applied to the column coil [22] a coercive force is applied to all the correspondingly ıated columns of cores in each one of the core planes the memory.

t will be appreciated that the representation of the e memory, both with respect to the number of cores a core plane, as well as the number of column coils, l the number of row coils, is substantially vestigial. s is done in order to avoid complexity in the drawing. ese arrangements are well known. Illustrative thereof basic arrangement shown in an article by J. W. Forter, entitled "Digital Information Storage in Three nensions Using Magnetic Cores," which is in the rnal of Applied Physics, volume 22, page 44, Jany 1951.

For the purpose of storing data, there is first assumed onvention wherein a magnetic core in one state of gnetic remanence represents a one and when in the er state of magnetic remanence represents a zero. The ımn address source 32 will provide, to a single column at a time, one-half of the excitation required for ring a core from one state of remanence to the other. row-address source 34 also applies to one row coil a time one-half the current required for driving a e from one state of remanence to the other. Thus, en the column coil 23 and the row coil 18 are excited ultaneously, then only the cores which receive a ıcidence of excitation from the row and column coils l be driven. These cores are the ones designated by erence numerals 10A, 12A, 14A, and 16A. The vari- row and column coils are excited by their respective lress sources in a manner to enter data sequentially the memory. Thus, successively applying an extion to row coils 18, 19, 20, 21, 22, which are respecly coupled to core groups 10A–16A, 10B–16B, –16C, 10D–16D, 10E–16E, and simultaneously and cessively to column coils 23, 24, 25, 26, and 27, can ılt in successively driving all the cores 10A through A, all the cores 10B through 16B . . . all the cores through 16E.

A core in each one of the core planes 10 through 16 l be prevented from being driven by the application of inhibit current from the respective inhibit current rces 40, 42, 44, 46. These inhibit current sources ly a current to an inhibit coil 50, 52, 54, 56, which in h instance is represented vestigially. The inhibit coil eads every one of the cores in the plane with which associated. The current applied to an inhibit coil by inhibit-current source is usually on the order of half the value required to drive a core, whereby it can pret the core receiving both the column and row coil drive m being driven, and it has substantially little or no ct on the remaining cores in a core plane.

Another winding which is provided in each core plane aprises the reading winding 60, 62, 64, 66, which is shown vestigially. The function of the reading wind- as is well known, is to have induced therein a voltage a core which is being driven from one to the other e of magnetic remanence. Each one of the reading ıdings drives a readout amplifier 70, 72, 74, 76.

Thus, for the purpose of entering data in a desired uence, a different row and column coil are excited drive all the cores which are coupled thereto to rep- ent a binary one. Where it is desired that a core in a e plane represent a binary zero, an inhibit current rce excited the inhibit coil simultaneously with excita- ı of the column and row coil. When it is desired to d out the data which has been entered into the memory, column and row address sources are employed to en- ize the respective row and column coils in the same uence as the one used for entering data. The cores driven toward their one state. Only those cores which in the zero state will therefore be driven, the others eady being in the one state. Thereby, the reading coils ı detect where binary zeros have been stored, and the other coils which will provide substantially no output indicate that a binary one has been stored in the particular associated core plane. From the foregoing brief description, it will be seen that data is stored successively in groups of cores, a group comprising, for example, the cores 10A, 12A, 14A, 16A. Each group comprises an identically located core in each one of the core planes.

Thus far, there has only been described a known type of buffer-storage arrangement. In accordance with this invention, when it is desired to provide an indication of the storage state of the buffer-storage system at various stages of storage, a core, which may be of the same type as those employed in the memory, is utilized. These cores are herewith designated as marker cores 80, 82, 84, 86, 88. A clear coil 90 is inductively coupled to all the marker cores. This clear coil is driven from a clear-current source 92. The manner of coupling the clear coil 90 to all the marker cores is such that the excitation of this coil will drive the marker core 80 to its one state of remanence, and the remaining marker cores 82, 84, 86, 88 to their zero states of remanence. Thus, the coil 90 coupled to the marker core 80 in one sense and to the remaining marker cores in the opposite sense. A reading coil 94 is inductively coupled to all the marker cores with a differing sense on each successive core. That is, it is coupled to the marker core 80 with one sense, to the marker core 82 with an opposite sense, to the marker core 84 again in the one sense, to the marker core 86 in an opposite sense, and to the marker core 88 in said one sense. The reading coil applies any output to a read amplifier 96. The output of the read amplifier 96 is applied to subsequent utilization apparatus, not shown.

The marker cores are driven by the same coils which drive a core group with which the marker core is to be associated. In other words, if, for example, it is desired to obtain an indication when the 120th core group is driven (here represented by cores [10E, 12E, 14E, 16E] *10A*, *12A*, *14A*, *16A*), then marker core 80, as well as marker core 82, which is a core associated with a succeeding core group, are driven by the same column and row coils which drive the 120th core group. This is achieved by coupling the column and row coils driving the 120th group (here coils 23 and 18) to marker core 80, as well as marker core 82, which is to be associated with a succeeding core group (which may be, for example, the 240th). The sense of the coupling to the marker core 80 is such as to drive it to its zero state of remanence when the row and column coils 18, 23 are excited, and to drive the marker core 82 to its one state of magnetic remanence.

When the marker cores in the counter are cleared, the marker core 80 is driven to its one state of remanence; therefore, upon receiving the drive of the excited row and column coils, it will be driven to its zero state of magnetic remanence. Marker core 82, however, will be driven to its one state of magnetic remanence. The output which is induced in the reading coil will therefore be that of both of the cores in view of the opposite coupling sense of the reading winding.

When the row and column coils are excited for driving the succeeding group of cores with which the marker core 82 is associated, then the marker core 82 is also driven to its zero-representative state of remanence, and the marker core 84 simultaneously is driven to its one state of remanence. The next group of cores, which is here exemplified by cores [10D, 12D, 14D, 16D] *10B*, *12B*, *14B*, *16B*, are driven when row coil 19 and column coil 24 are excited. These coils are coupled to the respective marker cores 82, 84 to respectively be able to drive marker core 82 to its zero state and marker core 84 to its one state. From the above description, it should become apparent that when it is desired to provide a signal representative of a state of storage of the magnetic-core memory, the coil or coils which excite the group of cores at the location for which a signal is desired are extended to drive two additional marker cores. One of these marker cores, which is the one associated with the particular core group, is driven to its zero, or clear, condition, and the marker core associated with the succeeding core group is driven to its one condition. Thus, row coil 20 and column coil 25 drive marker cores 84 and 86. Row coil 21 and column coil 26 drive marker cores 86 and 88. Row core 22 and column coil 27 drive marker cores 88 and 80. When the last of the marker cores 88 is driven to its zero state of magnetic remanence, the row and column coils 22, 27, which perform this operation, are also coupled to the first marker core 80 in the sequence to drive it to its one state.

The arrangement of making the marker cores in the form of a ring counter is provided so that when the buffer storage system is fully loaded with data, upon subsequent readout of this data, no clearing cycle for the marker cores is necessary. As previously pointed out, the readout of data occurs in the same sequence as the data was read into the buffer storage system. Thus, the use of a ring counter type of operation and alternation of the sense of the read winding allows the marker system to operate without clearing as the mode of operation of the memory is changed from loading to unloading. However, should the buffer storage system be only partially loaded before unloading is commenced, then a clearing cycle of operation is necessary. It will be appreciated that as many of the marker cores as are required may be added, the number shown being merely by way of example and not by way of limitation.

There has accordingly been shown and described herein a novel and useful arrangement for providing an output signal for indicating the state of storage of a magnetic-core storage system. The signals obtained are extremely useful when the storage system is used in conjunction with large-scale data-handling systems.

I claim:

1. Apparatus for providing signals indicative of the state of storage of a magnetic-core memory of the type having a plurality of magnetic cores each having two states of stable remanence whereby it may represent a bit of binary data, said plurality of cores being arranged in a plurality of groups with coil means being coupled to said core groups for entering data and for reading out data, said magnetic-core memory including means for energizing said coil means for entering data into said core groups in a predetermined sequence and for reading out data in the same sequence, said apparatus for providing signals including a magnetic marker core associated with each group of cores in said memory at which it is desired to provide an indicating signal, each marker core having two stable states of remanence respectively representing one and zero and being drivable from one to the other of said states, means for driving to its one state the marker core associated with the earliest core group in the data-entering sequence and for driving all said other marker cores to their zero states, means for driving each marker core to its zero state when the coil means of the associated core group is energized by said means for energizing and for driving the succeeding marker core to its one state, and means for deriving an output signal from the two driven marker cores.

2. Apparatus for providing signals indicative of the state of storage of a magnetic-core memory of the type having a plurality of magnetic cores each having two states of stable remanence whereby it may represent a bit of binary data, said plurality of cores being arranged in groups and having a plurality of separate coils coupled thereto for successively entering data into the core groups and for successively reading out data from said core groups, said magnetic-core memory including means for energizing said coils for entering data into a group of cores in a predetermined sequence and for reading out data in the same sequence, said apparatus for providing signals including a ring counter having a magnetic-marker core associated with each group of cores in said memory at which it is desired to provide an indicating signal, each marker core having two stable states of remanence respectively representing one and zero and being drivable from one to the other of said states, means for driving to its one state the marker core associated with the earliest of the groups of cores in the data-entering sequence and for driving all said other marker cores to their zero states, means for coupling the coils which enter data into a group of cores to an associated marker core in one sense and to the succeeding marker core with a sense opposite to said one sense for driving said associated marker core to its zero state and said succeeding marker core to its one state when said coils are energized by said means for energizing said coils, and means for deriving an output signal from the two driven marker cores.

3. Apparatus as recited in claim 2 wherein said means for deriving an output signal from the two driven marker cores comprise a reading coil inductively coupled to all said marker cores, the sense of said coupling on a core being reversed from the sense of said coupling on adjacent cores.

4. The combination with a magnetic-core memory of apparatus for signaling the storage state of said memory, said magnetic-core memory being of the type having a plurality of matrices, each matrix having a plurality of magnetic cores, each core having two states of stable remanence whereby it may represent a bit of binary data, said plurality of cores in each matrix being arranged in columns and rows, a group of cores for data storage being comprised of a similarly located core in each of the matrices, data entry into the groups of cores of said memory and data readout occurring in the same predetermined sequence, said apparatus comprising a magnetic-marker core associated with each group of cores for which a signal is desired, each marker core having two stable states of remanence respectively representing one and zero and being drivable from one to the other of said states, coil means coupled to all said marker cores for driving to its one state the marker core associated with the earliest of the groups of cores in the data-entering sequence and for driving all said other marker cores to their zero states, a separate coil means coupled to each group of cores for driving said cores for data entry and data readout, those of said coil means which are coupled to a group of cores with which a marker is associated being also coupled to the associated marker core with one sense and to the succeeding core with a sense opposite to said one sense, the coil means which is coupled to the last marker core with one sense being coupled to the first marker core with a sense opposite to said one sense, and a readout coil coupled to all said marker cores the sense of the coupling on a marker core being opposite to the sense of the coupling on adjacent marker cores.

5. The combination recited in claim 4 wherein said separate coil means coupled to each group of cores for driving said cores for data entry and data readout includes for each group of cores a row coil which is coupled to all the cores in similarly located rows in said plurality of matrices, and a column coil which is coupled to all the cores in similarly located columns in said plurality of matrices.

6. The combination with a magnetic-core memory of apparatus for signaling when several stages of storage capacity of said memory have been attained comprising a ring counter including a magnetic core for each stage of storage capacity for which an indication is desired, each of said cores having two stable states of remanence respectively representing one and zero and being drivable from one to the other, each of said cores being assigned for signaling a different stage of storage capacity, means for clearing said ring counter including a coil coupled to the first of said cores in one sense and to the others of said cores in a sense opposite to said one sense, means for storing data in said magnetic-core memory in a desired sequence and for reading out stored data in the same sequence, said last-named means including means for driving a core to its zero state of remanence when said memory reaches the stage of storage capacity to which said core has been assigned and for driving the succeeding core in said counter to its one state, and means for deriving an output from the driven cores including a coil coupled to each succeeding driven core with a sense opposite to the sense of coupling to a preceding core.

References Cited by the Examiner

The following references, cited by the examiner, are of record in the patented file or the original of this patent

UNITED STATES PATENTS

| | | |
|---|---|---|
| 2,691,156 | 10/54 | Saltz. |
| 2,709,248 | 5/55 | Rosenberg. |
| 2,768,367 | 10/56 | Rajchman. |
| 2,778,006 | 1/57 | Guterman. |

IRVING L. SRAGOW, *Primary Examiner.*